(12) United States Patent
Harada (10) Patent No.: US 10,996,195 B2
(45) Date of Patent: May 4, 2021

(54) ELECTROPHORESIS MEASUREMENT METHOD, DATA PROCESSING DEVICE, AND RECORDING MEDIUM

(71) Applicant: SHIMADZU CORPORATION, Kyoto (JP)

(72) Inventor: Akira Harada, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 108 days.

(21) Appl. No.: 15/638,641

(22) Filed: Jun. 30, 2017

(65) Prior Publication Data
US 2018/0038828 A1 Feb. 8, 2018

(30) Foreign Application Priority Data

Aug. 5, 2016 (JP) .............................. JP2016-154951
Mar. 17, 2017 (JP) .............................. JP2017-053373

(51) Int. Cl.
*G01N 27/447* (2006.01)
*G05B 23/02* (2006.01)

(52) U.S. Cl.
CPC ..... *G01N 27/44743* (2013.01); *G01N 27/44717* (2013.01); *G05B 23/0221* (2013.01)

(58) Field of Classification Search
CPC ....... G01N 27/44743; G01N 27/44717; G05B 23/0221
See application file for complete search history.

(56) References Cited

U.S. PATENT DOCUMENTS

| 2007/0112534 | A1* | 5/2007 | Jaeger | ................ G01N 30/8665 |
| | | | | 702/85 |
| 2009/0136139 | A1  | 5/2009 | Kataoka | |
| 2016/0267220 | A1* | 9/2016 | Becker | .................. G06T 11/206 |

FOREIGN PATENT DOCUMENTS

JP          4951752 B2      3/2012

OTHER PUBLICATIONS

Koji Kadota, Ryutaro Fukumura, Joseph J Rodrigue, Ryoko Araki and Masumi Abe A normalization strategy applied to HiCEP (an AFLP-basedexpression profiling) analysis: Toward the strict alignment of valid fragments across electrophoretic patterns), BMC Bioinformatics 2005, 6:43 (Year: 2005).*

* cited by examiner

*Primary Examiner* — Louis J Rufo
(74) *Attorney, Agent, or Firm* — Sughrue Mion, PLLC (57) ABSTRACT

There are provided an electrophoresis measurement method which can easily and accurately judge degree of similarity between reference data and measurement target data, a data processing device, and a data processing program. Detected data obtained by subjecting a reference sample to electrophoresis is standardized with reference to peaks of a lower limit marker substance and an upper limit marker substance, and thus reference data is acquired. Detected data obtained by subjecting a measurement target sample to electrophoresis is standardized with reference to peaks of the lower limit marker substance and the upper limit marker substance, and thus measurement target data is acquired. The measurement target data is warped or shifted in a time axis direction with reference to the reference data, and corrected measurement target data is obtained.

20 Claims, 7 Drawing Sheets

ELECTROPHORESIS MEASUREMENT METHOD, DATA PROCESSING DEVICE, AND RECORDING MEDIUM

BACKGROUND OF THE INVENTION

Field of the Invention

The present invention relates to an electrophoresis measurement method for performing measurement by electrophoresis, and a data processing device and a data processing program which perform data processing on detected data obtained by electrophoresis.

Description of the Related Art

In a case where a measurement target substance is measured by electrophoresis, a measurement target sample obtained by mixing the measurement target substance with a marker substance may be subjected to electrophoresis. Examples of the marker substance include a lower limit marker substance containing a component faster in electrophoresis speed than components contained in the measurement target substance and an upper limit marker substance containing a component slower in electrophoresis speed than the components included in the measurement target substance. In contrast, examples of a known method not using a marker substance include a method of using Dynamic Time Warping (DTW) as described in JP 4951752 B1, and a method of using dynamic programming.

Figure 8:
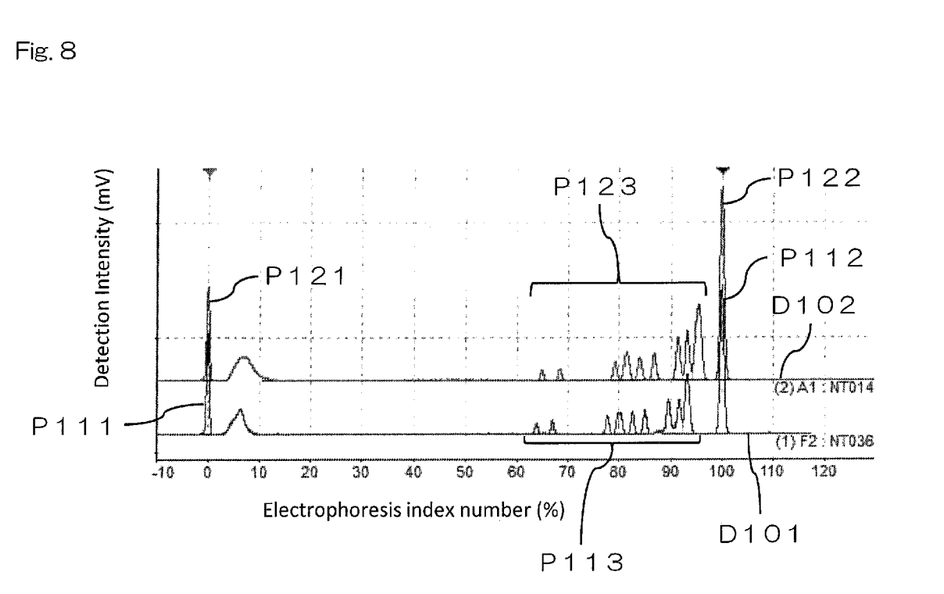
FIG. 8 is a diagram illustrating an example of detected data obtained by a method of using marker substances.

FIG. 8 is a diagram illustrating an example of detected data obtained by a method of using marker substances. FIG. 8 illustrates reference data D101 based on detected data obtained by subjecting a reference sample containing a reference substance (known substance) to electrophoresis, and measurement target data D102 based on detected data obtained by subjecting a measurement target sample containing a measurement target substance (unknown substance) to electrophoresis. The reference substance is a known substance serving as a reference. By comparing the reference data D101 obtained from the reference substance with the measurement target data D102 obtained from the measurement target substance, the components contained in the measurement target substance can be identified.

The reference sample is mixed with a lower limit marker substance and an upper limit marker substance in addition to the reference substance. In the reference data D101, a peak P111 derived from detection of the component of the lower limit marker substance and a peak P112 derived from detection of the component of the upper limit marker substance appear. In addition, a peak group P113 derived from detection of the components contained in the reference substance appears between the peak P111 and the peak P112.

Similarly, the measurement target sample is mixed with the lower limit marker substance and the upper limit marker substance in addition to the measurement target substance. In the measurement target data D102, a peak P121 derived from detection of the component of the lower limit marker substance and a peak P122 derived from detection of the component of the upper limit marker substance appear. In addition, a peak group P123 derived from detection of the components contained in the measurement target substance appears between the peak P121 and the peak P122.

In this example, detected data obtained by electrophoresis is standardized such that the time width between the peak P111 and the peak P112 in the reference data D101 and the time width between the peak P121 and the peak P122 in the measurement target data D102 are identical. That is, standardization is performed such that the time width from the peak P111 corresponding to the lower limit marker substance to the peak P121 corresponding to the upper limit marker substance in the data D101 and the time width from the peak P121 corresponding to the lower limit marker substance to the peak P122 corresponding to the upper limit marker substance in the data D102 are identical. Thus, as illustrated in FIG. 8, the peaks P111 and P121 corresponding to the lower limit marker substances in the data D101 and D102 overlap with each other, and the peaks P121 and P122 corresponding to the upper limit marker substances in the data D101 and D102 overlap with each other.

By comparing the standardized reference data D101 and the standardized measurement target data D102 with each other as described above, the components contained in the measurement target substance can be identified according to the degree of similarity between the peak groups P113 and P123 in the data D101 and D102.

SUMMARY OF THE INVENTION

However, in a case where the data D101 and D102 standardized by using the lower limit marker substance and the upper limit marker substance are compared with each other, even though data is obtained by measuring the substance identical to the reference substance as the measurement target substance, peak positions of the peak groups P113 and P123 corresponding to the identical components are shifted from each other as in the example in FIG. 8. A possible cause for this is an effect of the state of a device (a microchip or the like) used for electrophoresis, or the like.

In a case where the peak positions of the peak groups P113 and P123 are shifted from each other as described above, comparison (judgement of degree of similarity) between the data D101 and D102 becomes difficult. As a result, identification of the components contained in the measurement target substance becomes difficult or there is a possibility that an accurate identification result cannot be obtained in some cases.

The present invention is made in view of the above-described circumstances, and an object of the present invention is to provide an electrophoresis measurement method capable of easily and accurately judging the degree of similarity between reference data and measurement target data, a data processing device, and a data processing program.

(1) An electrophoresis measurement method according to the present invention includes a first electrophoresis process, a reference data acquisition process, a second electrophoresis process, a measurement target data acquisition process, and a data correction process. In the first electrophoresis process, detected data is acquired by subjecting a reference sample to electrophoresis, the reference sample being obtained by mixing a reference substance, a lower limit marker substance containing a component faster in electrophoresis speed than components contained in the reference substance, and an upper limit marker substance containing a component slower in electrophoresis speed than the components contained in the reference substance. In the reference data acquisition process, reference data is acquired by standardizing the detected data acquired in the first electrophoresis process to have a fixed time width with reference to peaks of the lower limit marker substance and the upper limit marker substance included in the detected data. In the second electrophoresis process, detected data is acquired by subjecting a measurement target sample to electrophoresis, the measurement target sample being obtained by mixing a measurement target substance, the lower limit marker substance containing the component faster in electrophoresis speed than components contained in the measurement target substance, and the upper limit marker substance containing the component slower in electrophoresis speed than the components contained in the measurement target substance. In the measurement target data acquisition process, measurement target data is acquired by standardizing the detected data acquired in the second electrophoresis process to have the fixed time width with reference to peaks of the lower limit marker substance and the upper limit marker substance contained in the detected data. In the data correction process, the reference data and the measurement target data are relatively warped or shifted in a time axis direction.

According to such a configuration, by relatively warping or shifting the reference data and the measurement target data in the time axis direction, the measurement target data can be corrected to be easily compared with the reference data. That is, data can be corrected such that a peak group derived from detection of the components contained in the reference substance and a peak group derived from detection of the components contained in the measurement target substance are located at positions where the peak groups are easily compared with each other in the time axis direction. Therefore, degree of similarity between the reference data and the measurement target data can be easily and accurately judged. In particular, an influence due to difference in components contained in the measurement target substance can be judged without being influenced by a shift in the time axis direction due to the device for electrophoresis or an electrophoresis condition.

(2) The data correction process may include a cross-correlation calculation process and a shift correction process. In the cross-correlation calculation process, the measurement target data is shifted in stages in the time axis direction, and cross-correlation between the measurement target data and the reference data in each shift amount is calculated. In the shift correction process, the measurement target data is shifted by the shift amount at which cross-correlation calculated in the cross-correlation calculation process is greatest.

According to such a configuration, the measurement target data can be shifted by the shift amount which enables the measurement target data to be easily compared with the reference data, according to cross-correlation between the measurement target data and the reference data in each shift amount obtained when the measurement target data is shifted in stages in the time axis direction.

(3) In the first electrophoresis process and the second electrophoresis process, detected data may be acquired by sampling data in a predetermined reference cycle. In this case, at least one of the measurement target data before or after being shifted in stages in the cross-correlation calculation process and the reference data may be resampled in a set cycle different from the reference cycle.

(4) The data correction process may include a first warped data acquisition process, a first correlation coefficient calculation process, and a warping direction determination process. In the first warped data acquisition process, the measurement target data is extended and contracted in the time axis direction, and two pieces of warped data are acquired according to the extended measurement target data and the contracted measurement target data. In the first correlation coefficient calculation process, the correlation coefficient between each of the two pieces of warped data and the reference data, and the correlation coefficient between the measurement target data before warping and the reference data are calculated. In the warping direction determination process, the warping direction of the measurement target data in the time axis direction is determined according to the correlation coefficients calculated in the first correlation coefficient calculation process.

According to such a configuration, the warping direction of the measurement target data which allows the measurement target data to be more easily compared with the reference data can be accurately determined according to the correlation coefficient between each of the two pieces of warped data obtained when the measurement target data is extended and contracted in the time axis direction and the reference data, and the correlation coefficient between the measurement target data before warping and the reference data.

(5) In the first correlation coefficient calculation process, the two pieces of warped data may be shifted in stages in the time axis direction, cross-correlation between each of the two pieces of warped data and the reference data in each shift amount may be calculated, and thus the correlation coefficient between each of the two pieces of warped data shifted by the shift amount at which the calculated cross-correlation is greatest and the reference data may be calculated. In addition, the measurement target data before warping may be shifted in stages in the time axis direction, cross-correlation between the measurement target data and the reference data in each shift amount may be calculated, and thus the correlation coefficient between the measurement target data shifted by the shift amount at which the calculated cross-correlation is greatest and the reference data may be calculated.

(6) In the first electrophoresis process and the second electrophoresis process, detected data may be acquired by sampling data in a predetermined reference cycle. In this case, at least one of the two pieces of warped data obtained in the first warped data acquisition process and the measurement target data before warping, and the reference data may be resampled at a set cycle different from the reference cycle.

(7) The data correction process may include a second warped data acquisition process, a second correlation coefficient calculation process, and a warping correction process. In the second warped data acquisition process, the measurement target data is extended or contracted in stages in the time axis direction, and a plurality of pieces of warped data is acquired according to the measurement target data in each warped amount. In the second correlation coefficient calculation process, the correlation coefficient between each of the plurality of pieces of warped data and the reference data, and the correlation coefficient between the measurement target data before warping and the reference data are calculated. In the warping correction process, the warped data or the measurement target data before warping which has the greatest correlation coefficient calculated in the second correlation coefficient calculation process is selected as the measurement target data after correction.

According to such a configuration, data which is more easily compared with the reference data can be set as the measurement target data after correction according to the correlation coefficient between the measurement target data in each warped amount obtained when the measurement target data is extended or contracted in stages in the time axis direction and the reference data, and the correlation coefficient between the measurement target data before warping and the reference data.

(8) In the second correlation coefficient calculation process, the plurality of pieces of warped data may be shifted in stages in the time axis direction, cross-correlation between each of the plurality of pieces of warped data and the reference data in each shift amount may be calculated, and thus the correlation coefficient between each of the plurality of pieces of warped data shifted by the shift amount at which the calculated cross-correlation is greatest and the reference data may be calculated. In addition, the measurement target data before warping may be shifted in stages in the time axis direction, cross-correlation between the measurement target data and the reference data in each shift amount may be calculated, and thus the correlation coefficient between the measurement target data shifted by the shift amount at which the calculated cross-correlation is greatest and the reference data may be calculated.

(9) In the first electrophoresis process and the second electrophoresis process, detected data may be acquired by sampling data in a predetermined reference cycle. In this case, at least one of the plurality of pieces of warped data obtained in the second warped data acquisition process and the measurement target data before warping, and the reference data may be resampled in a set cycle different from the reference cycle.

(10) The data correction process may include a warping correction process and a shift correction process. In the warping correction process, the measurement target data is extended or contracted in the time axis direction. In the shift correction process, the measurement target data is shifted in the time axis direction before or after the warping correction process.

(11) In at least one of the reference data acquisition process and the measurement target data acquisition process, the reference data or the measurement target data may be acquired by multiplying detection intensity in each cycle of the detected data resampled in the set cycle by a coefficient.

According to such a configuration, the detection intensity is multiplied by the coefficient in at least one of a peak group derived from detection of the components contained in the reference substance and a peak group derived from detection of the components included in the measurement target substance, and thus reference data or measurement target data which enables more accurate comparison for each component can be acquired.

(12) In the first electrophoresis process, a plurality of reference samples which each contain a different reference substance is subjected to electrophoresis, and thus a plurality of pieces of detected data which corresponds to the plurality of reference samples, respectively, may be obtained. In the reference data acquisition process, a plurality of pieces of reference data may be acquired from the plurality of pieces of detected data acquired in the first electrophoresis process. In the data correction process, the measurement target data may be relatively warped or shifted in the time axis direction with respect to the plurality of pieces of reference data. In this case, the electrophoresis measurement method may further include a degree of similarity judgement process of judging degree of similarity between the measurement target data which has been relatively warped or shifted and each reference data, and a conforming data selection process of selecting conforming data from among the plurality of pieces of reference data according to the judgement result in the degree of similarity judgement process.

According to such a configuration, degree of similarity between each of the plurality of pieces of reference data and the measurement target data is judged, and conforming data conforming to the measurement target data can be selected from among the plurality of pieces of reference data according to the judgement result.

(13) In the degree of similarity judgement process, degree of similarity may be judged according to the correlation coefficient between each reference data and the measurement target data, and the peak area of the measurement target data.

According to such a configuration, degree of similarity is judged by using the peak area of the measurement target data in addition to the correlation coefficient between each reference data and the measurement target data. Therefore, degree of similarity can be more accurately judged in consideration of the peak area in addition to peak positions.

(14) In the degree of similarity judgement process, degree of similarity may be judged according to the correlation coefficient between each reference data and the measurement target data, and the area ratio of the peak area of the measurement target data to the peak area of each reference data.

According to such a configuration, degree of similarity is judged by using the area ratio of the peak area of the measurement target data to the peak area of each reference data in addition to the correlation coefficient between each reference data and the measurement target data. Therefore, degree of similarity can be more accurately judged in consideration of the area ratio of the peak area in addition to the peak position.

(15) In the degree of similarity judgement process, degree of similarity may be judged according to the correlation coefficient between each reference data and the measurement target data, the peak area of the measurement target data, and the area ratio of the peak area of the measurement target data to the peak area of each reference data.

According to such a configuration, degree of similarity is judged by using the peak area of the measurement target data and the area ratio of the peak area of the measurement target data to the peak area of each reference data in addition to the correlation coefficient between each reference data and the measurement target data. Therefore, degree of similarity can be more accurately judged in consideration of the peak area and the area ratio in addition to peak positions.

(16) As the correlation coefficient between each reference data and the measurement target data, a mean value of correlation coefficients calculated in a plurality of regions included in the fixed time width may be used.

According to such a configuration, degree of similarity can be more accurately judged by using the mean value of the correlation coefficients calculated in the plurality of regions.

(17) A data processing device according to the present invention is a data processing device which performs data processing by using reference data and measurement target data. The data processing device includes a data correction unit which relatively warps or shifts the reference data and the measurement target data in the time axis direction.

(18) A non-transitory computer readable recording medium according to the present invention stores a data processing program which performs data processing by using reference data and measurement target data. The data processing program causes a computer to function as a data correction unit which relatively warps or shifts the reference data and the measurement target data in the time axis direction.

According to the present invention, by relatively warping or shifting the reference data and the measurement target data in the time axis direction, the measurement target data can be corrected to be easily compared with the reference data. Therefore, degree of similarity between the reference data and the measurement target data can be easily and accurately judged.

DETAILED DESCRIPTION OF THE PREFERRED EMBODIMENTS

1. Configuration of Electrophoresis System

Figure 1:
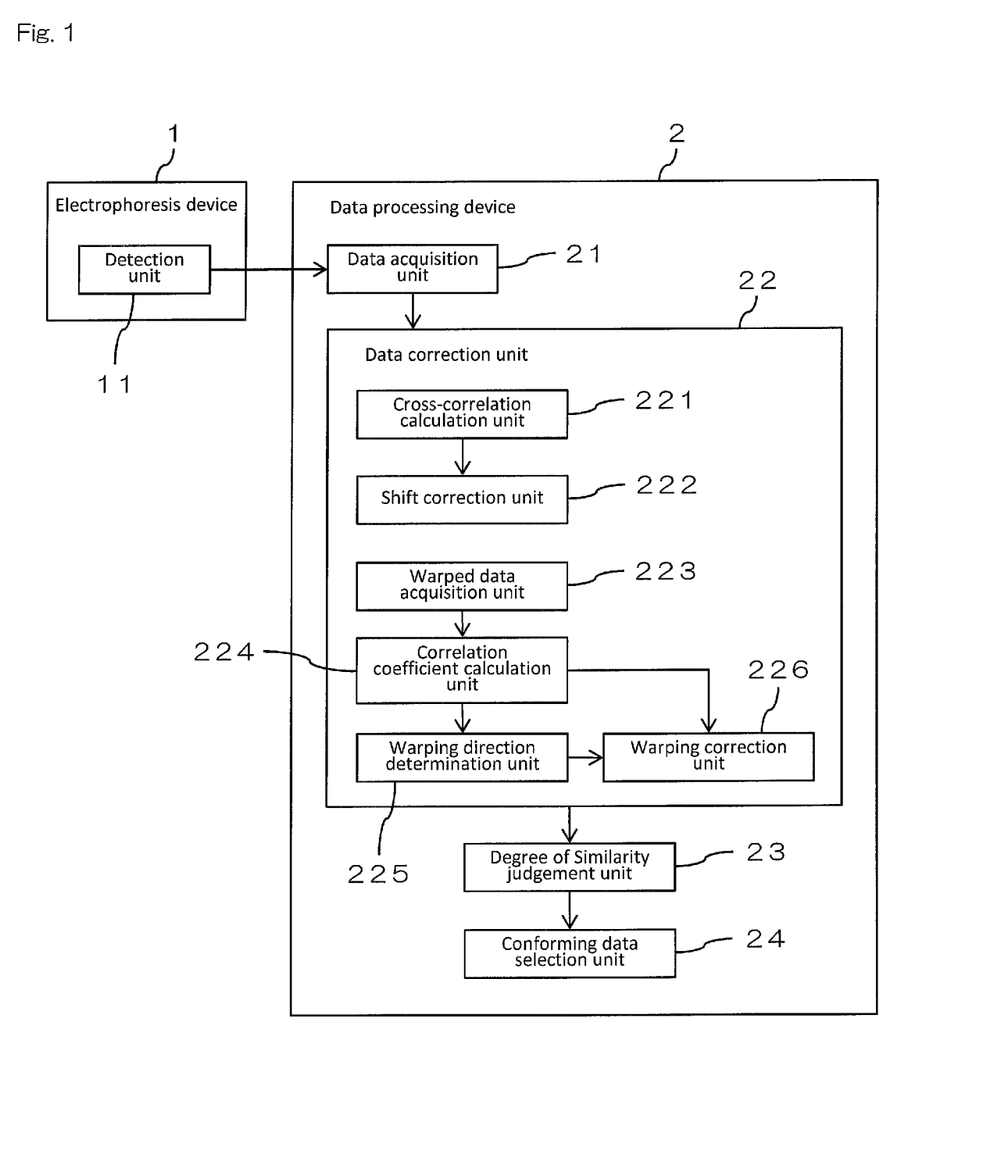
FIG. 1 is a block diagram illustrating an example of an electrophoresis system which performs measurement by using an electrophoresis measurement method according to an embodiment of the present invention.

FIG. 1 is a block diagram illustrating an example of an electrophoresis system which performs measurement by using an electrophoresis measurement method according to an embodiment of the present invention. The electrophoresis system includes an electrophoresis device 1 and a data processing device 2.

In the electrophoresis device 1, for example, a microchip (not illustrated) configured by forming a flow channel in a plate-shaped member is used to subject a sample to electrophoresis in the flow channel. The electrophoresis device 1 includes a detection unit 11 having, for example, a light emitting unit and a light receiving unit. Upon measurement, excitation light is emitted from the light emitting unit of the detection unit 11 to the sample subjected to electrophoresis in the flow channel, and fluorescence from the sample can be detected by the light reception unit. Note that the detection unit 11 is not limited to a configuration in which fluorescence from a sample is detected. For example, the detection unit 11 may be configured to detect absorbance by receiving transmitted light from a sample.

The data processing device 2 processes data (detection intensity of fluorescence) input from the detection unit 11 of the electrophoresis device 1. The data processing device 2 is configured to include a CPU (Central Processing Unit), for example. The CPU executes a program and thus the data processing device 2 functions as a data acquisition unit 21, a data correction unit 22, a degree of similarity judgement unit 23, a conforming data selection unit 24, or the like.

The data acquisition unit 21 acquires data input from the detection unit 11 of the electrophoresis device 1. The data correction unit 22 performs a process of correcting data acquired from the data acquisition unit 21. The data correction unit 22 includes, for example, a cross-correlation calculation unit 221, a shift correction unit 222, a warped data acquisition unit 223, a correlation coefficient calculation unit 224, a warping direction determination unit 225, a warping correction unit 226, and the like. The degree of similarity judgement unit 23 performs a process of judging degree of similarity by comparing pieces of data (waveform data) from each other. The conforming data selection unit 24 performs a process of selecting a piece of data as conforming data according to the judgement result made by the degree of similarity judgement unit 23.

2. Specific Example of Electrophoresis Measurement

Method

Figure 2:
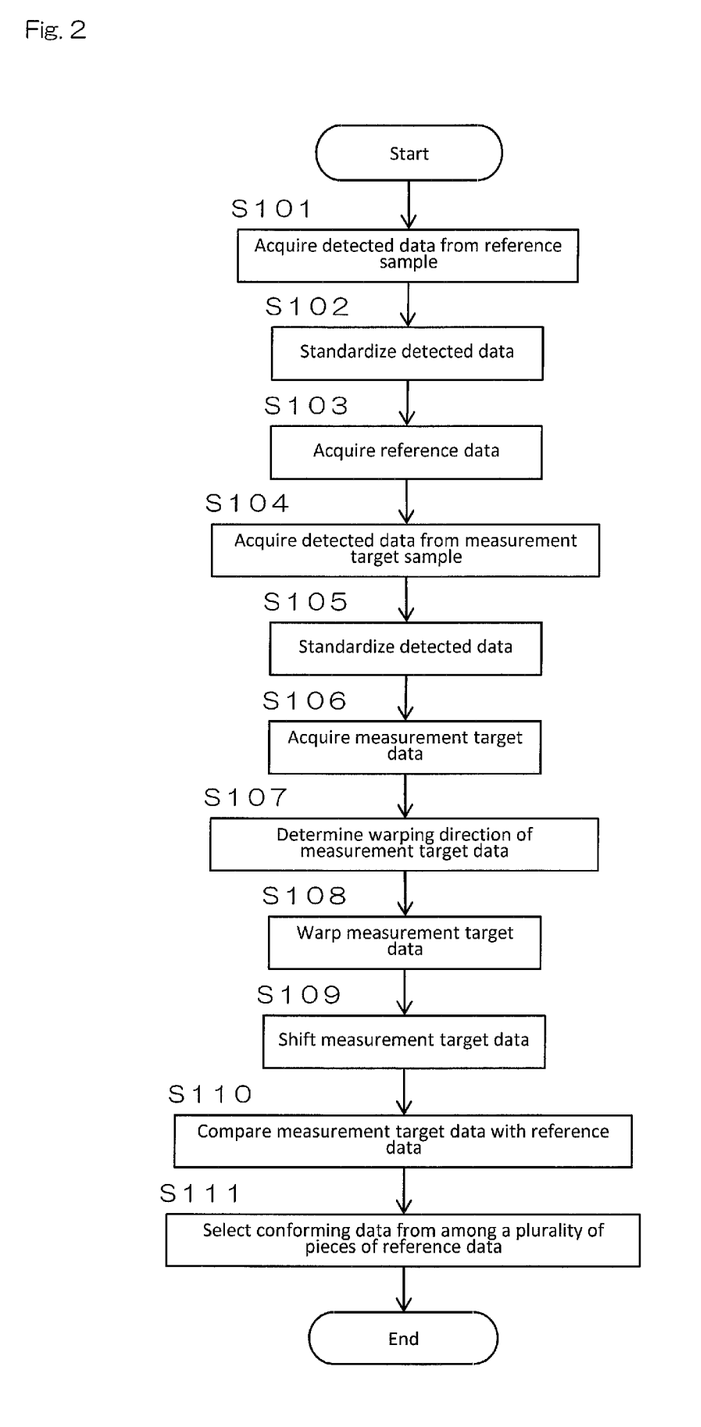
FIG. 2 is a flowchart illustrating an example of the electrophoresis measurement method.

FIG. 2 is a flowchart illustrating an example of the electrophoresis measurement method. In the present embodiment, pieces of data obtained by measuring a reference sample and a measurement target sample with the electrophoresis device 1 are processed by the data processing device 2.

The reference sample is a sample obtained by mixing a reference substance, a lower limit marker substance, and an upper limit marker substance. The reference substance is a known substance serving as a reference. The lower limit marker substance is a component faster in electrophoresis speed than components included in the reference substance, and the upper limit marker substance is a component slower in electrophoresis speed than the components included in the reference substance. Such a reference sample is subjected to electrophoresis by the electrophoresis device 1, and data input from the detection unit 11 is sampled by the data acquisition unit 21. Thus, detected data based on the reference sample is acquired (step S101: first electrophoresis process). At that time, sampling is performed by the data acquisition unit 21 in a predetermined cycle (reference cycle).

The detected data obtained according to the reference sample includes a peak group derived from detection of the components contained in the reference substance, and further includes a peak derived from detection of the component of the lower limit marker substance and a peak derived from detection of the component of the upper limit marker substance, the peaks being located across the peak group in a time axis direction. The data acquisition unit 21 standardizes such detected data such that the data has a fixed time width with reference to the peaks of the lower limit marker substance and the upper limit marker substance (step S102).

Specifically, similarly to the reference data D101 in FIG. 8, the detected data is standardized to have a fixed time width (index number width from 0 to 100%) by using electrophoresis index numbers expressing the position of the peak P111 of the lower limit marker substance as 0%, and the position of the peak P112 of the upper limit marker substance as 100%. It is assumed that the time axis in the present embodiment includes an axis of another parameter such as an electrophoresis index number calculated according to time.

At that time, the data acquisition unit 21 resamples the standardized detected data in a cycle (set cycle) set to a value different from the above reference cycle, and thus the reference data D101 as illustrated in FIG. 8 is acquired (step S103: reference data acquisition process). For example, the set cycle is set to be longer than the reference cycle. Note that when the standardized detected data is resampled in the set cycle, an interpolated value calculated by using spline interpolation, polynomial interpolation, or the like is added to or subtracted from each detection intensity in the reference cycle, and thus each detection intensity in the set cycle is interpolated.

One piece of reference data D101 may be obtained; however, in the present embodiment, a plurality of pieces of reference data D101 is acquired by using a plurality of reference samples. That is, in the first electrophoresis process in step S101, a plurality of reference samples each containing a different reference substance is subjected to electrophoresis, and thus a plurality of pieces of detected data corresponding to the reference samples, respectively, is acquired. In addition, in the reference data acquisition process in step S103, a plurality of pieces of reference data is acquired from the plurality of pieces of detected data acquired in the first electrophoresis process. Note that the lower limit marker substance and the upper limit marker substance contained in the reference sample are identical among the reference samples.

A measurement target sample is a sample obtained by mixing a measurement target substance, the lower limit marker substance, and the upper limit marker substance. The measurement target substance is a substance which is a target for measurement, and includes, for example, DNA or RNA. The lower limit marker substance is a component faster in electrophoresis speed than components included in the measurement target substance, and the upper limit marker substance is a component slower in electrophoresis speed than the components included in the measurement target substance. The lower limit marker substance and the upper limit marker substance mixed with the measurement target substance and the lower limit marker substance and the upper limit marker substance mixed with the reference substance are identical. Such a measurement target sample is subjected to electrophoresis by the electrophoresis device 1, and data input from the detection unit 11 is sampled by the data acquisition unit 21. Thus, detected data based on the measurement target sample is acquired (step S104: second electrophoresis process). At that time, sampling is performed by the data acquisition unit 21 in a cycle (reference cycle) similar to the cycle in a case of acquiring detected data based on the reference sample (step S101).

The detected data obtained according to the measurement target sample includes a peak group derived from detection of the components contained in the measurement target substance, and further includes a peak derived from detection of the component of the lower limit marker substance and a peak derived from detection of the component of the upper limit marker substance, the peaks being located across the peak group in the time axis direction. The data acquisition unit 21 standardizes such detected data such that the data has a fixed time width with reference to the peaks of the lower limit marker substance and the upper limit marker substance (step S105).

Specifically, similarly to the measurement target data D102 in FIG. 8, the detected data is standardized to have a fixed time width (index number width from 0 to 100%) by using electrophoresis index numbers expressing the position of the peak P121 of the lower limit marker substance as 0%, and the position of the peak P122 of the upper limit marker substance as 100%. At that time, the data acquisition unit 21 resamples the standardized detected data in the above set cycle, and thus the measurement target data D102 as illustrated in FIG. 8 is acquired (step S106: measurement target data acquisition process). Note that when the standardized detected data is resampled in the set cycle, an interpolated value calculated by using spline interpolation, polynomial interpolation, or the like is added to or subtracted from each detection intensity in the above reference cycle, and thus each detection intensity in the set cycle is interpolated.

As described, since resampling is performed in an identical cycle (set cycle) when the reference data D101 is acquired (step S103) and when the measurement target data D102 is acquired (step S106), pieces of data sampled at an identical timing can be compared with each other. Then, the data correction unit 22 warps or shifts the measurement target data D102 in the time axis direction (electrophoresis index number axis direction) with reference to the reference data D101, and the measurement target data is corrected (steps S107 to S109: data correction process).

Specifically, first, the direction (warping direction) in which the measurement target data is extended or contracted in the time axis (electrophoresis index number axis) is determined (step S107). Then, after the measurement target data has been extended or contracted in the determined warping direction (step S108), the measurement target data after warping is shifted in the time axis direction (step S109). Note that the measurement target data may be neither extended nor contracted as described later.

In the present embodiment, the data correction process in steps S107 to S109 is performed by using each reference data D101. That is, in the data correction process, the measurement target data D102 is relatively warped or shifted with reference to the plurality of pieces of reference data D101. Thus, the measurement target data can be corrected to be more easily compared with each reference data.

Then, the degree of similarity judgement unit 23 compares each reference data D101 with the measurement target data corrected by using each reference data D101, and thus judges degree of similarity of each reference data (step S110: degree of similarity judgement process). Then, according to the judgement result, the conforming data selection unit 24 selects conforming data from among the plurality of pieces of reference data D101 (step S111: conforming data selection process). That is, the piece of reference data D101 which has the highest degree of similarity to the corrected measurement target data is selected as conforming data.

3. Example of Corrected Measurement Target Data

Figure 3:
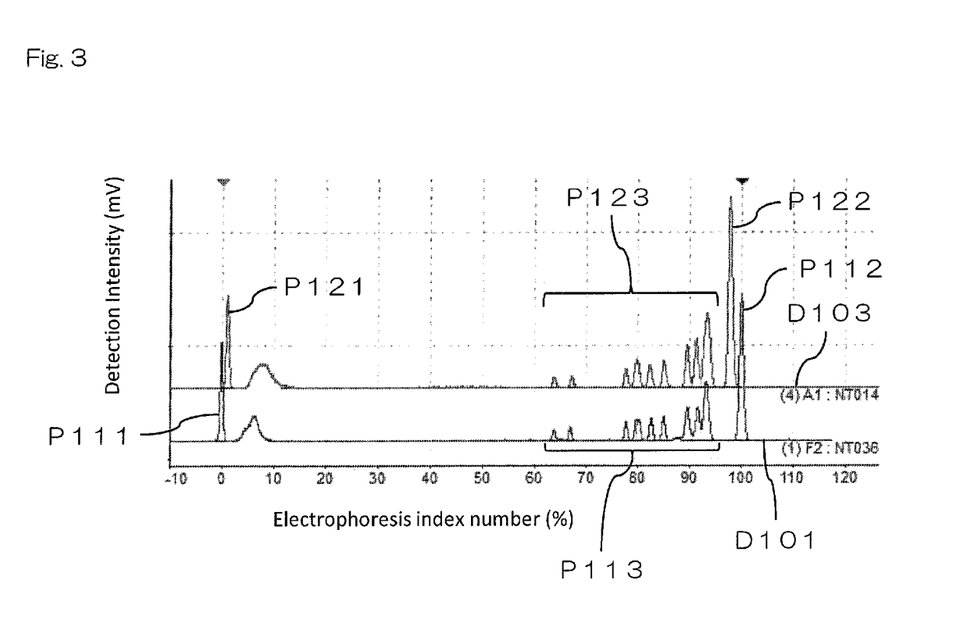
FIG. 3 is a diagram illustrating an example of corrected measurement target data.

FIG. 3 is a diagram illustrating an example of corrected measurement target data D103. This example illustrates the result of obtaining the corrected measurement target data D103 by warping and shifting the measurement target data D102 illustrated in FIG. 8 in the time axis direction with reference to the reference data D101.

In the corrected measurement target data D103, the measurement target data D102 is contracted such that the interval between the peak P121 of the lower limit marker substance and the peak P122 of the upper limit marker substance in the time axis direction is narrowed. Then, the contracted measurement target data D102 is shifted in the time axis direction. Thus, as illustrated in FIG. 3, the measurement target data D103 can be obtained, the measurement target data D103 being corrected such that the position in the time axis direction of the peak group P123 derived from detection of the components contained in the measurement target substance approaches the position in the time axis direction of the peak group P113 derived from detection of the components contained in the reference substance.

As described, in the present embodiment, the measurement target data D102 is warped and shifted in the time axis direction with reference to the reference data D101, and thus the measurement target data D102 can be corrected to the measurement target data D103 which can be easily compared with the reference data D101. That is, the measurement target data D102 can be corrected such that the peak group P113 derived from detection of the components contained in the reference substance and the peak group P123 derived from detection of the components contained in the measurement target substance are located at positions where the peaks are easily compared with each other in the time axis direction. Therefore, degree of similarity between the reference data D101 and the measurement target data D103 can be easily and accurately judged.

4. Process Upon Determination of Warping Direction

Figure 4:
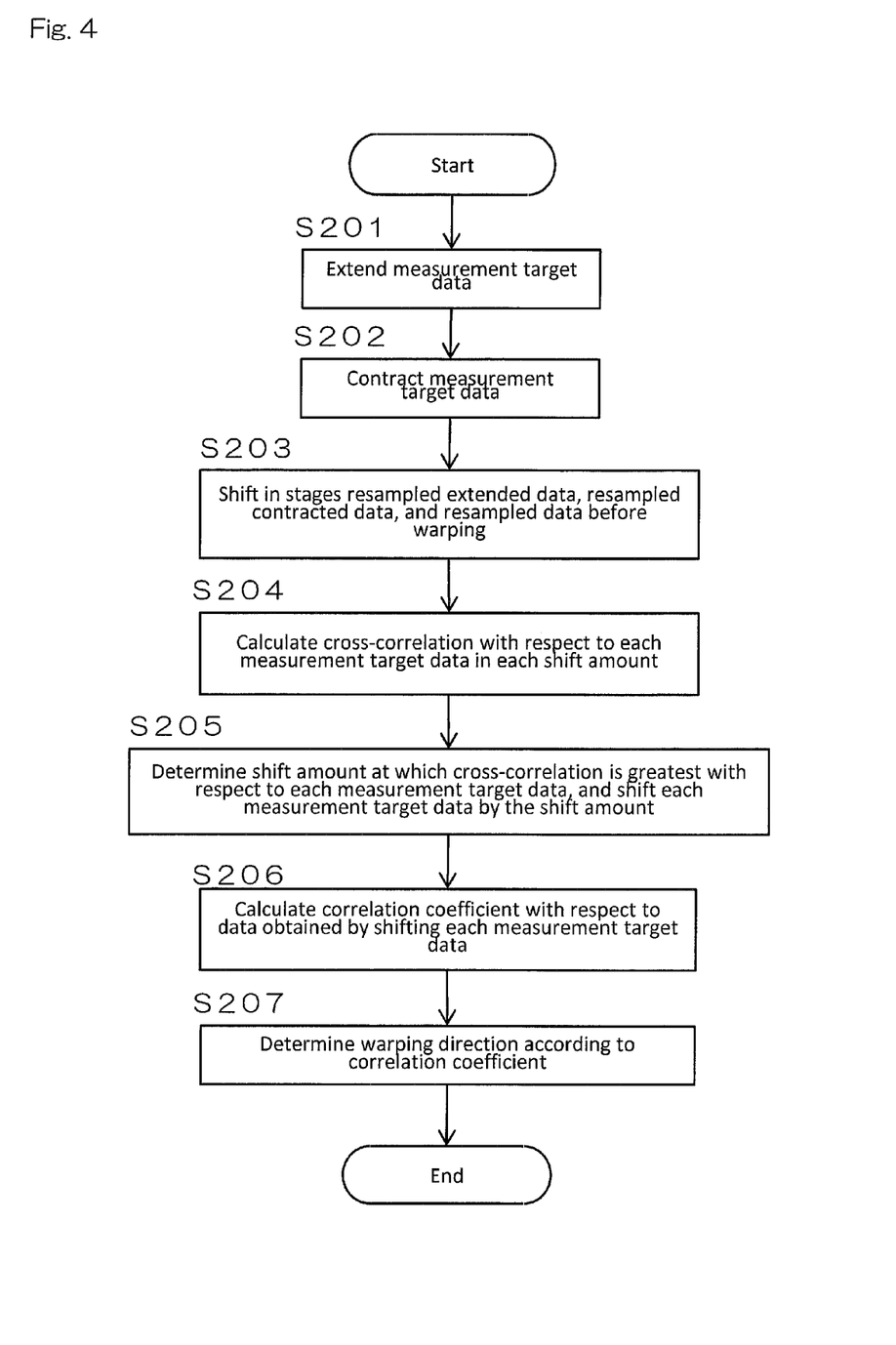
FIG. 4 is a flowchart illustrating an example of a specific process upon determination of a warping direction of the measurement target data.

FIG. 4 is a flowchart illustrating an example of a specific process upon determination of the warping direction of the measurement target data D102. This process is performed by using each of the plurality of pieces of reference data D101. The warping direction of the measurement target data D102 corresponding to each reference data D101 is determined.

Upon determination of the warping direction of the measurement target data D102, first, the warped data acquisition unit 223 extends and contracts the measurement target data D102 in the time axis direction, and acquires extended measurement target data and contracted measurement target data (steps S201 and S202: first warped data acquisition process). Thus, three pieces of data, that is, the extended measurement target data, the contracted measurement target data, and the measurement target data D102 before warping are acquired. At that time, each of the extended measurement target data, the contracted measurement target data, and the measurement target data D102 before warping is resampled in a predetermined set cycle.

Specifically, the peak P121 of the lower limit marker substance or the peak P122 of the upper limit marker substance is moved by any amount along the time axis direction. At that time, if the peak P121 of the lower limit marker substance is moved in a positive direction (direction of increasing the electrophoresis index number) or if the peak P122 of the upper limit marker substance is moved in a negative direction (direction of decreasing the electrophoresis index number), extended measurement target data is obtained. In contrast, if the peak P121 of the lower limit marker substance is moved in the negative direction or if the peak P122 of the upper limit marker substance is moved in the positive direction, contracted measurement target data is obtained.

Then, the correlation coefficient calculation unit 224 shifts in stages in the time axis direction each of the extended measurement target data, the contracted measurement target data, and the measurement target data D102 before warping, and calculates cross-correlation between each measurement target data and the reference data D101 in each shift amount (steps S203 and S204). Then, the shift amount at which the calculated cross-correlation is greatest is determined for each of the extended measurement target data, the contracted measurement target data, and the measurement target data D102 before warping, and each measurement target data is shifted by the determined shift amount (step S205). Since the specific process performed when the measurement target data is shifted and the specific process when the cross-correlation is calculated are similar to the processes to be described later with reference to FIG. 6, a detailed description of the processes will be omitted.

The correlation coefficient calculation unit 224 calculates the correlation coefficient (R+) between the extended measurement target data after having been shifted and the reference data D101, the correlation coefficient (R−) between the contracted measurement target data after having been shifted and the reference data D101, and the correlation coefficient (R0) between the measurement target data before warping which has been shifted and the reference data D101 (step S206: first correlation coefficient calculation process). The warping direction determination unit 225 thus determines the warping direction of the measurement target data D102 in the time axis according to the three types of correlation coefficients R+, R−, and R0 calculated as described above (step S207: warping direction determination process).

The correlation coefficient is well known, and therefore will not be described in detail. The correlation coefficient is a value indicating degree of closeness between the positions where the peaks appear. The correlation coefficient becomes closer to "1" as the positions of the peaks of pieces of data to be compared with each other are closer, and becomes closer to "−1" as the positions of the peaks are separated. Therefore, the warping direction of the measurement target data D102 can be determined according to the following criteria (A) to (D).

(A): In a case where the correlation coefficient R0>the correlation coefficient R+ and the correlation coefficient R0>the correlation coefficient R− are satisfied, it is determined that the measurement target data D102 is "not warped".

(B): In a case other than (A) and where the correlation coefficient R+>the correlation coefficient R− is satisfied, it is determined that the measurement target data D102 is "extended".

(C): In a case other than (A) and where the correlation coefficient R−>the correlation coefficient R+ is satisfied, it is determined that the measurement target data D102 is "contracted".

(D): In a case other than (A) to (C), steps S201 to S206 are repeated until any one of (A) to (C) is satisfied while increasing the movement amount of the peak P121 of the lower limit marker substance or the peak P122 of the upper limit marker substance in the time axis direction.

According to the process as illustrated in FIG. 4, the warping direction of the measurement target data D102 which enables the measurement target data D102 to be easily compared with the reference data D101 can be accurately determined according to the correlation coefficients R+ and R− between the two pieces of warped data obtained when the measurement target data D102 is extended and contracted in the time axis direction and the reference data D101 and the correlation coefficient R0 between the measurement target data D102 and the reference data D101.

5. Process Upon Warping

Figure 5:
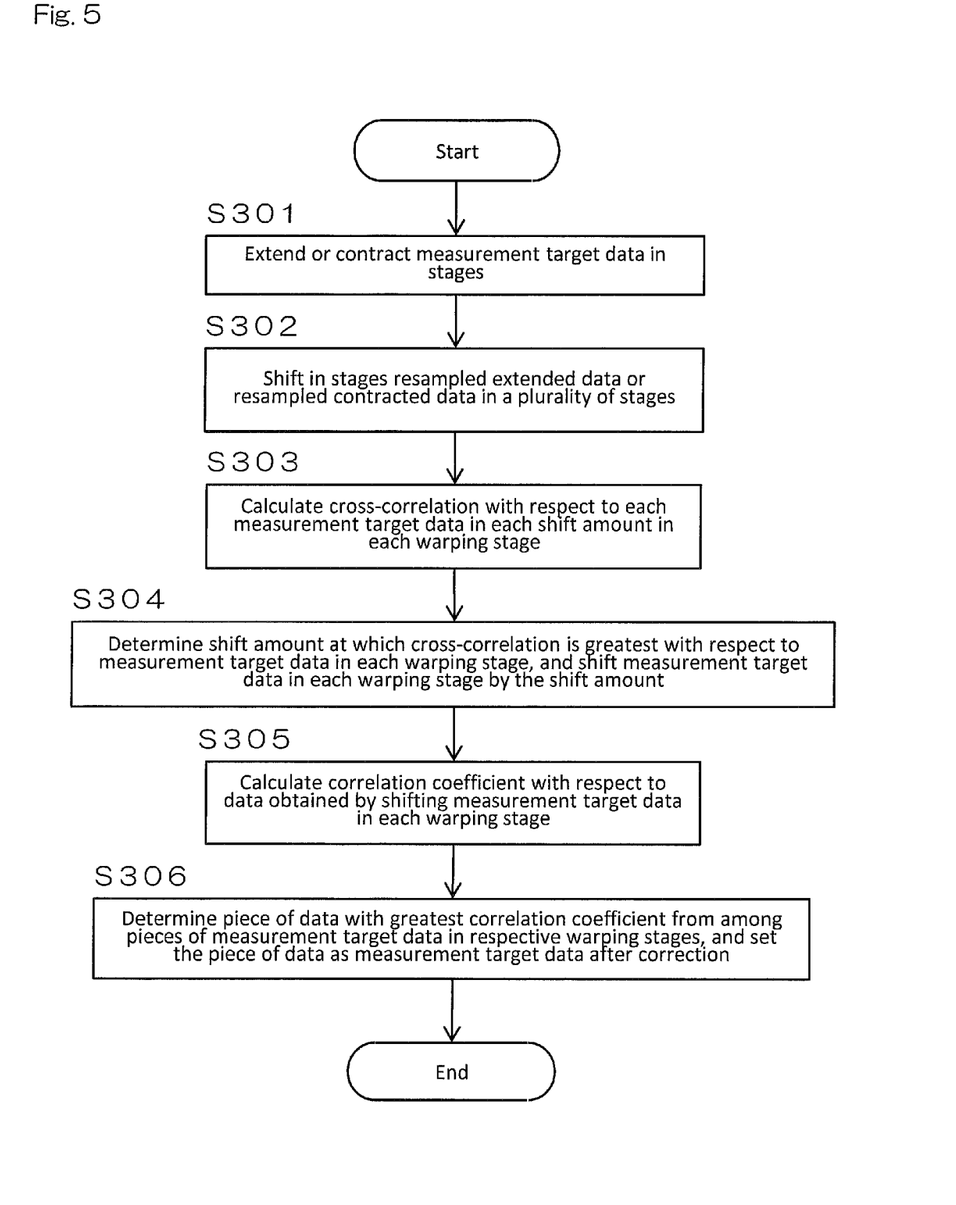
FIG. 5 is a flowchart illustrating an example of a specific process upon warping of the measurement target data.

FIG. 5 is a flowchart illustrating an example of a specific process upon warping of the measurement target data D102. This process is performed by using each of the plurality of pieces of reference data D101, and thus the measurement target data D102 warped correspondingly to each reference data D101 can be obtained.

When the warping direction of the measurement target data D102 is determined, the warped data acquisition unit 223 extends or contracts the measurement target data D102 in stages in the time axis direction according to the warping direction. That is, in a case where it is determined in the process of S207 in FIG. 4 that the measurement target data D102 is extended, the measurement target data D102 is extended in stages in the time axis direction, and in a case where it is determined that the measurement target data D102 is contracted, the measurement target data D102 is contracted in stages in the time axis direction. Then, by resampling in a predetermined set cycle each measurement target data obtained when the data is extended or contracted in stages, a plurality of pieces of warped data is acquired (step S301: second warped data acquisition process). In a case where it is determined in the process of S207 in FIG. 4 that the measurement target data D102 is neither extended nor contracted, the measurement target data D102 is neither extended nor contracted, and the step of S301 will not be performed.

Specifically, in a case where it is determined that the measurement target data D102 is extended, the movement amount of the peak P121 of the lower limit marker substance in the positive direction, or the movement amount of the peak P122 of the upper limit marker substance in the negative direction is increased in stage within the range of an allowable warped amount, and measurement target data in each extension amount is prepared. At that time, the measurement target data before warping is included in extended data in a plurality of stages assuming that the extension amount of the measurement target data before warping is zero. In contrast, in a case where it is determined that the measurement target data D102 is contracted, the movement amount of the peak P121 of the lower limit marker substance in the negative direction, or the movement amount of the peak P122 of the upper limit marker substance in the positive direction is increased in stages within the range of the allowable warped amount, and measurement target data in each contraction amount is prepared. At that time, the measurement target data before warping is included in contracted data in a plurality of stages assuming that the contraction amount of the measurement target data before warping is zero. Extended data or contracted data in each stage is resampled in a predetermined cycle.

When the plurality of pieces of warped data corresponding to the warped amounts in the plurality of stages is acquired as described above, the correlation coefficient calculation unit 224 shifts in stages each of the warped data in the plurality of stages in the time axis direction, and calculates cross-correlation between each measurement target data and the reference data D101 in each shift amount in each warping stage (steps S302 and S303). Then, the shift amount at which calculated cross-correlation is greatest from among the respective shift amounts is determined for each measurement target data in each warping stage, and the measurement target data in each warping stage is shifted by the determined shift amount (step S304). Since the specific process performed when the measurement target data is shifted and the specific process when cross-correlation is calculated are similar to the processes to be described later with reference to FIG. 6, a detailed description of the processes will be omitted.

The correlation coefficient calculation unit 224 calculates the correlation coefficient between the data obtained by shifting the measurement target data in each warping stage by the shift amount determined in S304 and the reference data D101 (step S305: second correlation coefficient calculation process). That is, the correlation coefficient between the measurement target data D102 resampled at each warped amount (including a case where the data is not warped) and the reference data D101 is calculated.

Then, the warping correction unit 226 determines data which has the greatest calculated correlation coefficient from among the plurality of pieces of measurement target data in the plurality of warping stages, and set the data as measurement target data after correction (step S306: warping correction process). Thus, the data having the highest degree of similarity to the reference data D101 is determined to be the measurement target data D103 after correction.

According to the process illustrated in FIG. 5, measurement target data D103 after correction is adopted according to the correlation coefficient between the measurement target data and the reference data D101 in each warped amount obtained when the measurement target data D102 is extended or contracted in stages in the time axis direction, and thus the measurement target data D103 after correction can be obtained which has high identification accuracy of a measured substance in a case where the data is compared with the reference data D101.

6. Process Upon Shift

Figure 6:
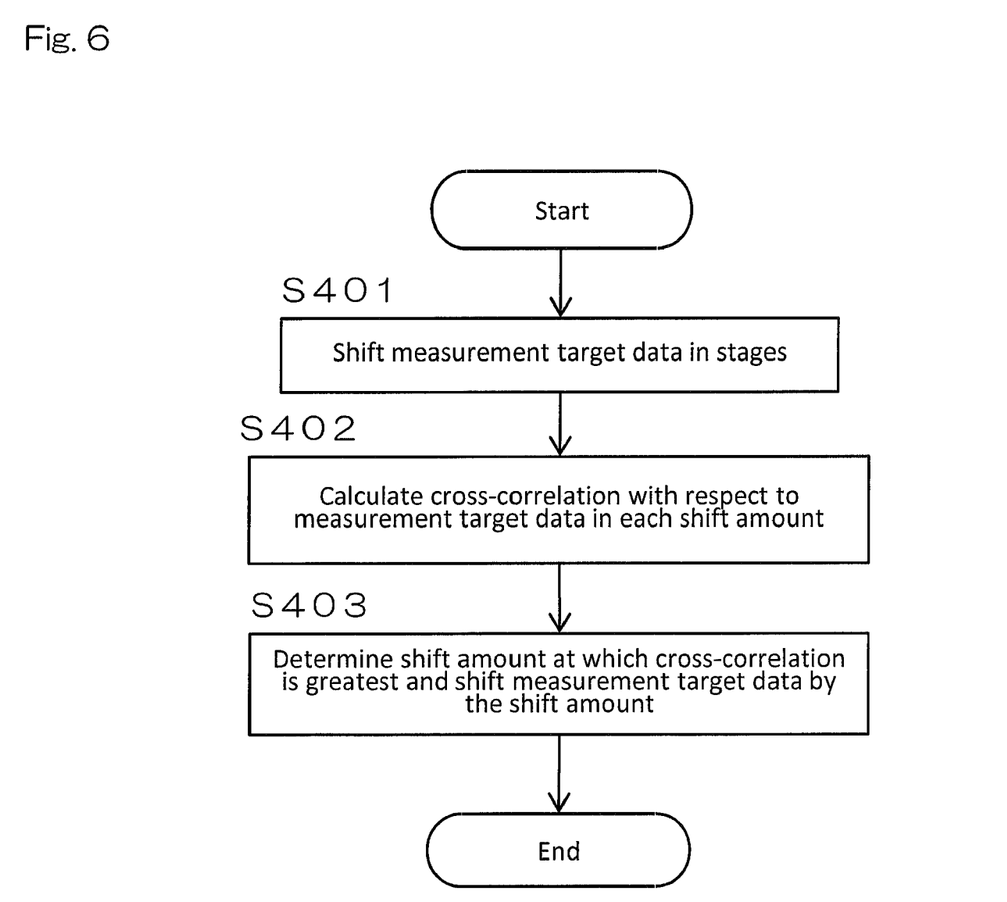
FIG. 6 is a flowchart illustrating an example of a specific process upon shift of the measurement target data.

FIG. 6 is a flowchart illustrating an example of a specific process upon shift of the measurement target data D102. This process is performed by using each of the plurality of pieces of reference data D101, and thus the measurement target data D102 shifted correspondingly to each reference data D101 can be obtained.

Upon shift of the measurement target data D102, the cross-correlation calculation unit 221 shifts the measurement target data D102 (warped measurement target data or measurement target data which is not warped) in stages in the time axis direction, and calculates cross-correlation between the measurement target data D102 and the reference data D101 in each shift amount (steps S401 and S402: cross-correlation calculation process).

Specifically, the measurement target data D102 is shifted in stages in the positive direction and the negative direction within the range of an allowable shift amount. At that time, the measurement target data D102 is shifted in stages within a conforming range set in advance as the range in the time axis direction where the peak group P123 of the measurement target data D102 appears. The conforming range is set to be different depending on the kind of the measurement target substance. In the example illustrated in FIG. 3, a plurality of the conforming ranges is set in the range from 55 to 96%. Note that the above-described correlation coefficient is also calculated according to data within the conforming range.

Cross-correlation is well known, and therefore will not be described in detail. Signal intensity of the measurement target data D102 obtained in the above set cycle and the signal intensity of the reference data D101 are multiplied, the measurement target data D102 and the reference data D101 being sampled at an identical timing. The integrated value of the multiplied values represents cross-correlation. Therefore, as degree of similarity between pieces of data to be compared with each other is higher, the value of cross-correlation becomes greater.

The shift correction unit 222 shifts the measurement target data D102 by the shift amount at which cross-correlation calculated as described above is greatest (step S403: shift correction process). Thus, the measurement target data D102 is shifted in the time axis direction by the shift amount at which degree of similarity with the reference data D101 is highest. The measurement target data D102 is resampled in the above set cycle before or after the data is shifted in stages in step S401.

According to the process illustrated in FIG. 6, the measurement target data D102 can be shifted by the shift amount which enables the measurement target data D102 to be easily compared with the reference data D101, according to cross-correlation between the measurement target data D102 and the reference data D101 in each shift amount at which the measurement target data D102 is shifted in stages in the time axis direction. According to the processes in FIGS. 4 to 6, the measurement target data D103 after correction, as illustrated in FIG. 3, can be obtained.

7. Modification Example of Warping Correction and Shift Correction

The present invention is not limited to the above embodiment. The following configuration is possible as long as the configuration includes a warping correction process of extending or contracting the measurement target data D102 in the time axis direction and a shift correction process of shifting the measurement target data D102 in the time axis direction before or after the warping correction process.

For example, the measurement target data D102 is extended and contracted in stages in the time axis direction within a predetermined warped range at a predetermined warping rate (warping correction process) without determining the warping direction first. For example, the warped range is 95 to 105%, and the warping rate is 1%. Thus, 11 pieces of measurement target data D102 including a piece of data which is not warped can be obtained. The shift correction process is performed for the plurality of pieces of measurement target data D102 obtained as described above.

Specifically, the plurality of pieces of measurement target data D102 is shifted in stages in the time axis direction, and cross-correlation between the measurement target data D102 and the reference data D101 at each shift amount is calculated. Then, measurement target data D102 (optimal shift data) which is obtained by shifting each of the plurality of pieces of measurement target data D102 by the shift amount at which the calculated cross-correlation is greatest is obtained. The correlation coefficient between each of the plurality of pieces of optimal shift data obtained as described above and the reference data D101 is calculated. The optimal shift data (measurement target data D102) with the greatest calculated correlation coefficient is set as the measurement target data D103 after correction.

Note that the present invention is not limited to the configuration where the shift correction process is performed after the warping correction process as described above. The shift correction process may be performed before the warping correction process. In addition, in a case of determining the warping direction, first, two pieces of warped data (for example, 99% and 101%) is obtained, the correlation coefficient between each of the two pieces of warped data and the reference data D101, and the correlation coefficient between the measurement target data (100%) before warping and the reference data D101 are calculated. Thus, the warping direction can be determined according to the data which has the greatest correlation coefficient.

8. First Example of Degree of Similarity Judgement

Hereinafter, a specific manner in which the degree of similarity judgement unit 23 judges degree of similarity will be described. The degree of similarity judgement unit 23 judges degree of similarity by using a correlation coefficient A between each reference data D101 and the measurement target data D103 after correction, a peak area B of the measurement target data D103 after correction, and an area ratio C of the peak area of the measurement target data D103 after correction to the peak area of each reference data D101.

Figure 7:
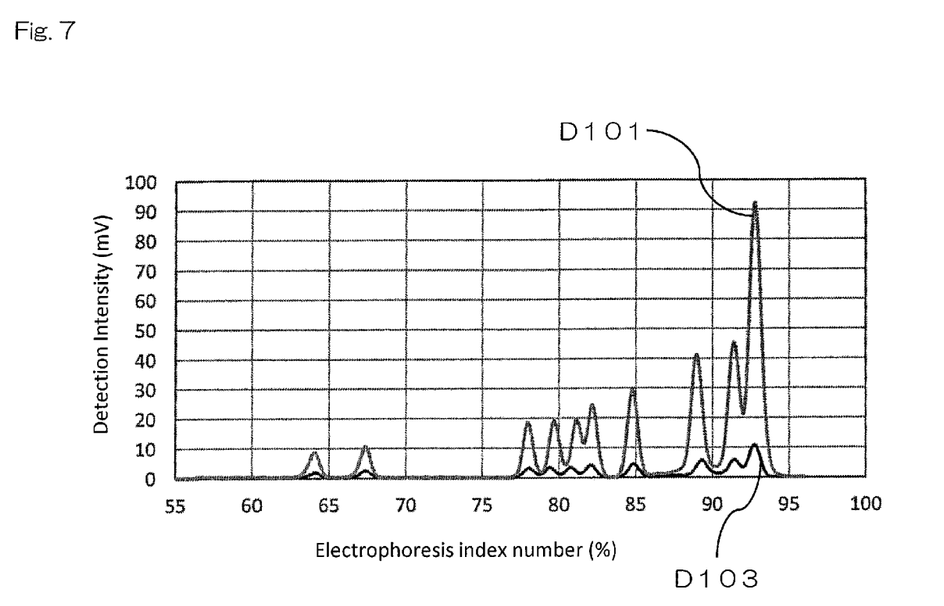
FIG. 7 is a diagram illustrating examples of the reference data and the measurement target data after correction.

FIG. 7 is a diagram illustrating examples of the reference data D101 and the measurement target data D103 after correction. As illustrated in FIG. 7, in a case where the peak position of the reference data D101 and the peak position of the measurement target data D103 after correction are close to each other, the correlation coefficient A is a value close to "1". Therefore, it is possible to select the reference data with the greatest correlation coefficient A from among the plurality of pieces of reference data according to only the correlation coefficients A, and to set the selected reference data as conforming data which conforms to the measurement target data. However, in this case, since signal intensity of the reference data D101 and signal intensity of the measurement target data D103 after correction are not taken into consideration, an identical judgement result is obtained even in a case where signal intensity of the reference data D101 and signal intensity of the measurement target data D103 greatly differ from each other. Therefore, whether or not the reference data is appropriate as conforming data may not be accurately judged.

In view of the foregoing, the present embodiment has a configuration in which degree of similarity is judged by using the peak area B of the measurement target data D103 and the area ratio C of the peak area of the measurement target data D103 to the peak area of each reference data D101, in addition to the correlation coefficient A between each reference data D101 and the measurement target data D103. Thus, it is possible to more accurately judge degree of similarity in consideration of the peak area B and the area ratio C in addition to the peak position.

Specifically, a predetermined region (region of interest) in the time axis (including the electrophoresis index number axis) is set, and the peak area B and the area ratio C in the region of interest are calculated. In the example illustrated in FIG. 7, for example, the region ranging from 60 to 95% of the electrophoresis index number is set as the region of interest. The degree of similarity judgement unit 23 calculates the area enclosed by the time axis and the reference data D101 in the region of interest set in advance, as the peak area of the reference data D101, and calculates the area enclosed by the time axis and the measurement target data D103 as the peak area of the measurement target data D103. Then, the peak area of the calculated measurement target data D103 is divided by the peak area of the reference data D101, and thus the area ratio C is calculated.

The degree of similarity judgement unit 23 obtains an evaluation value E1 by the following formula by using the calculated correlation coefficient A, the calculated peak area B, and the calculated area ratio C. Each of α, β, and γ in the following formula is a coefficient, and is determined by using known data (supervised data) measured in advance.

$$E1 = A \times \alpha + B \times \beta + C \times \gamma$$

The conforming data selection unit 24 selects conforming data from among the plurality of pieces of reference data D101 by using the calculated evaluation value E1. At that time, one piece of the reference data D101 having the greatest evaluation value E1, that is, one piece of the reference data D101 with the highest degree of similarity to the measurement target data D103 is selected as conforming data. Note that a configuration may be adopted where in a case where the value of the greatest evaluation value E1 is less than a threshold set in advance, it is judged that there is no conforming data and no conforming data is selected.

In the above example, the configuration has been described where the degree of similarity judgement unit 23 judges degree of similarity by using the correlation coefficient A, the peak area B, and the area ratio C. However, the present invention is not limited to such a configuration. A configuration may be adopted where only the correlation coefficient A and the peak area B are used to judge degree of similarity, or a configuration may be adopted where only the correlation coefficient A and the area ratio C are used to judge degree of similarity.

9. Second Example of Degree of Similarity Judgment

In a case of calculating the correlation coefficient A between each reference data D101 and the measurement target data D103 after correction, the region of interest may be divided into a plurality of regions in the time axis direction, and the mean value of correlation coefficients calculated in the respective regions may be obtained. For example, in FIG. 7, the region of interest ranging from 60 to 95% of the electrophoresis index number is divided into a first region ranging from 60 to 75% of the electrophoresis index number, a second region ranging from 75 to 87.5% of the electrophoresis index number, and a third region ranging from 87.5 to 95% of the electrophoresis index number. Then, the correlation coefficient is calculated in each of the first to third regions. A mean value such as arithmetic mean, weighted mean, or geometric mean of the correlation coefficients is obtained, and thus the mean value is calculated as the correlation coefficient A.

As described, by using the mean value of correlation coefficients calculated in a plurality of regions included in a fixed time width, as the correlation coefficient A between each reference data D101 and the measurement target data D103, degree of similarity can be judged more accurately. Note that similarly to the correlation coefficient A, the mean value of peak areas or area ratios calculated in the plurality of regions may be used as the peak area B or the area ratio C.

10. Another Modified Example

In the above embodiment, a description has been given of a case where each detection intensity in the above reference cycle is interpolated and each interpolated detection intensity is used as it is when standardized detected data is resampled in the above set cycle in step S103 (reference data acquisition process) and step S106 (measurement target data acquisition process) in FIG. 2. However, the present invention is not limited to such a configuration. A configuration may be adopted where the reference data D101 or the measurement target data D102 is obtained by multiplying each detection intensity in the reference cycle by a coefficient.

Specifically, each detection intensity is multiplied by the coefficient expressed by the following formula (1). Note that sampling timing serving as a reference is set, for example, at a start point of a conforming range.

[Mathematical Expression 1]

$$\frac{\text{value expressed by Formula (2) at timing when each detection intensity within conforming range is sampled}}{\text{value expressed by Formula (2) at sampling timing serving as a reference}} \quad (1)$$

As the above formula (2), the following formula (2-1) or (2-2) is used.

[Mathematical Expression 2]

$$\left(\frac{D}{T(i)} - \frac{D}{T(i+1)}\right) \times T(i+1) \quad (2\text{-}1)$$

$$\left(\frac{D}{T(i)} - \frac{D}{T(i+1)}\right) \times S \quad (2\text{-}2)$$

In Formula (2-1), D is an effective migration length (μm), T(i) is migration time (s) corresponding to ith sampling timing. In a case where a coefficient is calculated by Formula (1) by using Formula (2-1), D is deleted and the coefficient becomes a function including only T(i) and T(i+1). As a result, it can be said that the calculated coefficient is a ratio of the difference in movement distance after measurement.

In contrast, in Formula (2-2), S is any sampling timing (s), and is set, for example, at one second after the start point of the conforming range. D and T(i) are identical to those in Formula (2-1). In a case where a coefficient is calculated by Formula (1) by using Formula (2-2), D and S are deleted and the coefficient becomes a function including only T(i) and T(i+1). As a result, it can be said that the calculated coefficient is a ratio of the difference in movement distance after one second.

Arithmetic operation using the above coefficient may not be carried out in both the reference data acquisition process and the measurement target data acquisition process, and may be carried out in only one of the processes. Therefore, detection intensity is multiplied by the coefficient in at least one of the peak group P113 derived from detection of the components included in the reference substance, and the peak group P123 derived from detection of the components included in the measurement target substance, and reference data D101 or measurement target data D102 which enables more accurate comparison for each component can be acquired.

In steps S201 and S202 in FIG. 4, when the peak P121 of the lower limit marker substance or the peak P122 of the upper limit marker substance is moved along the time axis direction, the measurement target data D102 may be shifted such that the center of the conforming range after movement is located at the position identical to the position before movement. Similarly, in step S301 in FIG. 5, when the peak P121 of the lower limit marker substance or the peak P122 of the upper limit marker substance is moved along the time axis direction, the measurement target data D102 may be shifted such that the center of the conforming range after movement is located at the position identical to the position before movement.

In the above embodiment, the configuration has been described where the measurement target data D102 is warped, and then is shifted. However, the present invention is not limited to such a configuration. A configuration may be adopted where the measurement target data D102 is shifted and then is warped, or a configuration may be adopted where the measurement target data D102 is warped or shifted. In addition, the reference data D101 may be warped or shifted in the time axis direction with reference to the measurement target data D102 instead of warping or shifting the measurement target data D102 in the time axis direction with reference to the reference data D101. That is, any configuration may be adopted as long as the reference data D101 and the measurement target data D102 are relatively warped or shifted in the time axis direction. In this case, the reference data D101 may be resampled in the above set cycle.

In the above embodiment, a specific configuration of the data processing device 2 has been described; however, a program (data processing program) for causing a computer to function as the data processing device 2 can be provided. In this case, the program may be provided in a state of being stored in a recording medium, or the program itself may be provided.

What is claimed is:

1. An electrophoresis measurement method comprising:
    acquiring first detected data by subjecting a reference sample to electrophoresis, the reference sample being obtained by mixing a reference substance, a lower limit marker substance which contains a component faster in electrophoresis speed than components contained in the reference substance, and an upper limit marker substance which contains a component slower in electrophoresis speed than the components contained in the reference substance;
    acquiring standardized first detected data by standardizing the first detected data to have a fixed time width between a first reference peak corresponding to the lower limit marker substance in the first detected data and a second reference peak corresponding to the upper limit marker substance in the first detected data;
    acquiring second detected data by subjecting a measurement target sample to electrophoresis, the measurement target sample being obtained by mixing a measurement target substance, the lower limit marker substance, and the upper limit marker substance;
    acquiring standardized second detected data by standardizing the second detected data to have the fixed time width between a first target measurement peak corresponding to the lower limit marker substance in the second detected data and a second target measurement peak corresponding to the upper limit marker substance in the second detected data; and
    acquiring measurement target data by performing data correction of the standardized second detected data by performing warping and shifting of the standardized second detected data, wherein
        the warping of the standardized second detected data includes at least one of extending or contracting the standardized second detected data in a time axis direction with reference to the first detected data, and
        the shifting includes shifting the warped standardized second detected data such that a first data profile between the first target measurement peak in the warped standardized second detected data and the second target measurement peak in the warped standardized second detected data corresponds to a second data profile between the first reference peak in the standardized first detected data and the second reference peak in the standardized first detected data.

2. The electrophoresis measurement method according to claim 1, wherein the performing of the data correction of the standardized second detected data includes:
    calculating a cross-correlation between the measurement target data and reference data corresponding to the standardized first detected data in each shift amount; and
    shifting the measurement target data by a shift amount at which the calculated cross-correlation is greatest.

3. The electrophoresis measurement method according to claim 2, wherein
    the first detected data and the second detected data are acquired by sampling data in a predetermined reference cycle, and
    the electrophoresis measurement method further comprises resampling, in a set cycle that is different from the predetermined reference cycle, at least one of the measurement target data before being shifted or the measurement target data after being shifted.

4. The electrophoresis measurement method according to claim 1, wherein the performing of the data correction of the standardized second detected data includes:
    extending or contracting the measurement target data in the time axis direction;
    acquiring two pieces of warped data according to the extended or contracted measurement target data;
    calculating a correlation coefficient between each of the two pieces of warped data and reference data corresponding to the standardized first detected data, and a correlation coefficient between the measurement target data before warping and the reference data; and
    determining a warping direction of the measurement target data in the time axis direction according to each of the calculated correlation coefficients.

5. The electrophoresis measurement method according to claim 4, wherein the two pieces of warped data are shifted in stages in the time axis direction, a cross-correlation between each of the two pieces of warped data and the reference data in each shift amount is calculated, a third correlation coefficient between each of the two pieces of warped data shifted by a shift amount at which the calculated cross-correlation is greatest and the reference data is calculated, the measurement target data before warping is shifted in stages in the time axis direction, a cross-correlation between the measurement target data and the reference data in each shift amount is calculated, and a correlation coefficient between the measurement target data which is shifted by the shift amount at which the calculated cross-correlation is greatest and the reference data is calculated.

6. The electrophoresis measurement method according to claim 4, wherein
    the first detected data and the second detected data are acquired by sampling data in a predetermined reference cycle, and
    at least one of the two pieces of warped data which are obtained or the measurement target data before warping are resampled at a set cycle different from the predetermined reference cycle.

7. The electrophoresis measurement method according to claim 1, wherein the performing of the data correction of the standardized second detected data includes:
    performing at least one of extending or contracting of the measurement target data in stages in the time axis direction, and acquiring a plurality of pieces of warped data according to the measurement target data in each warped amount;

calculating a correlation coefficient between each of the plurality of pieces of warped data and reference data corresponding to the standardized first detected data, and a correlation coefficient between the measurement target data before warping and the reference data; and selecting one piece of data, from among the plurality of pieces of warped data and the measurement target data before warping, having a greatest calculated correlation coefficient, as the measurement target data after correction.

8. The electrophoresis measurement method according to claim 7, wherein the plurality of pieces of warped data is shifted in stages in the time axis direction, a cross-correlation between each of the plurality of pieces of warped data and the reference data in each shift amount is calculated, a correlation coefficient between each of the plurality of pieces of warped data which is shifted by a shift amount at which the calculated cross-correlation is greatest and the reference data is calculated, the measurement target data before warping is shifted in stages in the time axis direction, a cross-correlation between the measurement target data and the reference data in each shift amount is calculated, and a correlation coefficient between the measurement target data which is shifted by the shift amount at which the calculated cross-correlation is greatest and the reference data is calculated.

9. The electrophoresis measurement method according to claim 7, wherein
the first detected data and the second detected data are acquired by sampling data in a predetermined reference cycle, and
at least one of the acquired plurality of pieces of warped data or the measurement target data before warping are resampled in a set cycle different from the predetermined reference cycle.

10. The electrophoresis measurement method according to claim 1, wherein the performing of the data correction of the standardized second detected data includes:
performing one of extending or contracting of the measurement target data in the time axis direction; and
shifting the measurement target data in the time axis direction at a time which is one of before or after the performing of the one of the extending or the contracting.

11. The electrophoresis measurement method according to claim 1, wherein one of reference data corresponding to the standardized first detected data or the measurement target data is acquired by multiplying a detection intensity in each cycle of detected data which is resampled in a set cycle by a coefficient.

12. The electrophoresis measurement method according to claim 1, wherein
a plurality of reference samples which each contain a different reference substance is subjected to electrophoresis, and a plurality of pieces of detected data which corresponds to the plurality of reference samples, respectively, is obtained,
a plurality of pieces of reference data is acquired from the plurality of pieces of detected data which is obtained by being subjected to the electrophoresis, and
one of relative warping of or shifting of the measurement target data in the time axis direction is performed with respect to the plurality of pieces of reference data, the electrophoresis measurement method further comprising: determining a degree of similarity between the measurement target data which is subjected to the at least one of the relative warping or the shifting, and each of the plurality of pieces of reference data, and selecting conforming data from among the plurality of pieces of reference data according to the determined degree of similarity.

13. The electrophoresis measurement method according to claim 12, wherein the degree of similarity is determined according to a correlation coefficient between each of the plurality of pieces of reference data and a peak area of the measurement target data.

14. The electrophoresis measurement method according to claim 12, wherein the degree of similarity is determined according to a correlation coefficient between each of the plurality of pieces of reference data and an area ratio of a peak area of the measurement target data to a peak area of each of the plurality of pieces of reference data.

15. The electrophoresis measurement method according to claim 12, wherein the degree of similarity is determined according to a correlation coefficient between each of the plurality of pieces of reference data, a peak area of the measurement target data, and an area ratio of the peak area of the measurement target data to a peak area of each of the plurality of pieces of reference data.

16. The electrophoresis measurement method according to claim 13, wherein as a correlation coefficient between each of the plurality of pieces of reference data and the measurement target data, a mean value of correlation coefficients which are calculated in a plurality of regions that is included in the fixed time width is used.

17. A data processing device comprising:
a processor configured to:
acquire first detected data by subjecting a reference sample to electrophoresis, the reference sample being obtained by mixing a reference substance, a lower limit marker substance which contains a component faster in electrophoresis speed than components contained in the reference substance, and an upper limit marker substance which contains a component slower in electrophoresis speed than the components contained in the reference substance;
acquire standardized first detected data by standardizing the first detected data to have a fixed time width between a first reference peak corresponding to the lower limit marker substance in the first detected data and a second reference peak corresponding to the upper limit marker substance in the first detected data;
acquire second detected data by subjecting a measurement target sample to electrophoresis, the measurement target sample being obtained by mixing a measurement target substance, the lower limit marker substance, and the upper limit marker substance;
acquire standardized second detected data by standardizing the second detected data to have the fixed time width between a first target measurement peak corresponding to the lower limit marker substance in the second detected data and a second target measurement peak corresponding to the upper limit marker substance in the second detected data; and
acquire measurement target data by performing data correction of the standardized second detected data by performing warping and shifting of the standardized second detected data, wherein the warping of the standardized second detected data includes at least one of extending or contracting the standardized second detected data in a time axis direction with reference to the standardized first detected data, and the shifting includes shifting the warped standardized second detected data such that a first data profile between the first target measurement peak in the warped standardized second detected data and the second target measurement peak in the warped standardized second detected data corresponds to a second data profile between the first reference peak in the standardized first detected data and the second reference peak in the standardized first detected data.

18. A non-transitory computer readable recording medium storing a data processing program that includes computer-executable instructions that, when executed by a computer, causes the computer to:

acquire first detected data by subjecting a reference sample to electrophoresis, the reference sample being obtained by mixing a reference substance, a lower limit marker substance which contains a component faster in electrophoresis speed than components contained in the reference substance, and an upper limit marker substance which contains a component slower in electrophoresis speed than the components contained in the reference substance;

acquire standardized first detected data by standardizing the first detected data to have a fixed time width between a first reference peak corresponding to the lower limit marker substance in the first detected data and a second reference peak corresponding to the upper limit marker substance in the first detected data;

acquire second detected data by subjecting a measurement target sample to electrophoresis, the measurement target sample being obtained by mixing a measurement target substance, the lower limit marker substance, and the upper limit marker substance;

acquire standardized second detected data by standardizing the second detected data to have the fixed time width between a first target measurement peak corresponding to the lower limit marker substance in the second detected data and a second target measurement peak corresponding to the upper limit marker substance in the second detected data; and acquire measurement target data by performing data correction of the standardized second detected data by performing relative warping and shifting of the standardized second detected data, wherein the warping of the standardized second detected data includes at least one of extending or contracting the standardized second detected data in a time axis direction with reference to the standardized first detected data, and the shifting includes shifting the warped standardized second detected data such that a first data profile between the first target measurement peak in the warped standardized second detected data and the second target measurement peak in the warped standardized second detected data corresponds to a second data profile between the first reference peak corresponding to the lower limit marker substance in the first detected data and the second reference peak in the standardized first detected data.

19. The electrophoresis measurement method according to claim 1, further comprising: identifying the measurement target substance based on a comparison of the acquired measurement target data with the standardized first detected data.

20. The data processing device according to claim 17, wherein the processor is further configured to: identify the measurement target substance based on a comparison of the acquired data corrected measurement target data with the first detected data.

* * * * *